US012699169B2

(12) United States Patent　　(10) Patent No.:　US 12,699,169 B2
　　Pabbisetty　　　　　　　　　　　(45) Date of Patent:　Aug. 4, 2026

(54) METHOD, INFORMATION PROCESSING DEVICE AND SYSTEM

(71) Applicant: KABUSHIKI KAISHA TOSHIBA, Tokyo (JP)

(72) Inventor: Gurusanthosh Pabbisetty, Kisarazu Chiba (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 240 days.

(21) Appl. No.: 18/588,706

(22) Filed: Feb. 27, 2024

(65) Prior Publication Data

US 2024/0361441 A1　　Oct. 31, 2024

(30) Foreign Application Priority Data

Apr. 28, 2023　(JP) ................................. 2023-074536

(51) Int. Cl.
　　*G01S 11/06*　　　(2006.01)
　　*H04W 24/08*　　　(2009.01)
(52) U.S. Cl.
　　CPC ............. *G01S 11/06* (2013.01); *H04W 24/08* (2013.01)
(58) Field of Classification Search
　　CPC ........... G01S 11/06; G01S 5/14; H04W 24/08
　　See application file for complete search history.

(56) References Cited

U.S. PATENT DOCUMENTS 6,845,239 B1　　1/2005　Sato et al.
10,117,051 B2 *　10/2018　Banavar .................. H04W 4/80

11,463,963 B2 *　10/2022　Nguyen ............... H04B 17/309
2012/0119880 A1 *　5/2012　Ponnuswamy ....... H04W 24/00
　　　　　　　　　　　　　　　　　340/8.1
2015/0105029 A1 *　4/2015　Russell ................... H04W 4/80
　　　　　　　　　　　　　　　　　455/67.11
2015/0245311 A1 *　8/2015　Wang ........................ G01S 5/14
　　　　　　　　　　　　　　　　　455/456.1
2016/0327950 A1 *　11/2016　Bachrach ............. H04N 23/661
　　　　　　　　　(Continued)

FOREIGN PATENT DOCUMENTS

JP　　　　2000244967 A　　9/2000
JP　　　　2001298764 A　　10/2001
　　　　　　　　(Continued)

OTHER PUBLICATIONS

Japanese Office Action (and an English language translation thereof) dated Mar. 31, 2026, issued in corresponding Japanese Application No. 2023-074536.

*Primary Examiner* — Liem H. Nguyen

(74) *Attorney, Agent, or Firm* — Holtz, Holtz & Volek PC

(57)　　　　　ABSTRACT

According to one embodiment, a method includes receiving a first wireless signal transmitted from a first wireless device, receiving a second wireless signal transmitted from a second wireless device, and estimating a range of a propagation loss index corresponding to a space between the first wireless device and an information processing device based on a strength of the first wireless signal at the time of reception, a strength of the second wireless signal at the time of reception, and a distance between the first wireless device and the second wireless device. The propagation loss index is used to convert the strength of the first wireless signal into the distance between the first wireless device and the information processing device.

13 Claims, 7 Drawing Sheets

(56)      References Cited

U.S. PATENT DOCUMENTS

| | | | |
|---|---|---|---|
| 2018/0007516 A1 | 1/2018 | Ge et al. | |
| 2018/0040076 A1* | 2/2018 | Horie | G06Q 10/40 |
| 2022/0070607 A1 | 3/2022 | Ebner et al. | |
| 2022/0085898 A1 | 3/2022 | Nishimura | |
| 2022/0148431 A1* | 5/2022 | Kasahara | G01S 11/06 |
| 2022/0408401 A1* | 12/2022 | Abdulqader | G01S 5/02521 |

FOREIGN PATENT DOCUMENTS

| | | | | |
|---|---|---|---|---|
| JP | 2004053510 A | * | 2/2004 | |
| JP | 2018507588 A | | 3/2018 | |
| JP | 2020159705 A | | 10/2020 | |
| JP | 2022049757 A | | 3/2022 | |
| WO | WO-2018184096 A1 | * | 10/2018 | G01S 5/02524 |

* cited by examiner

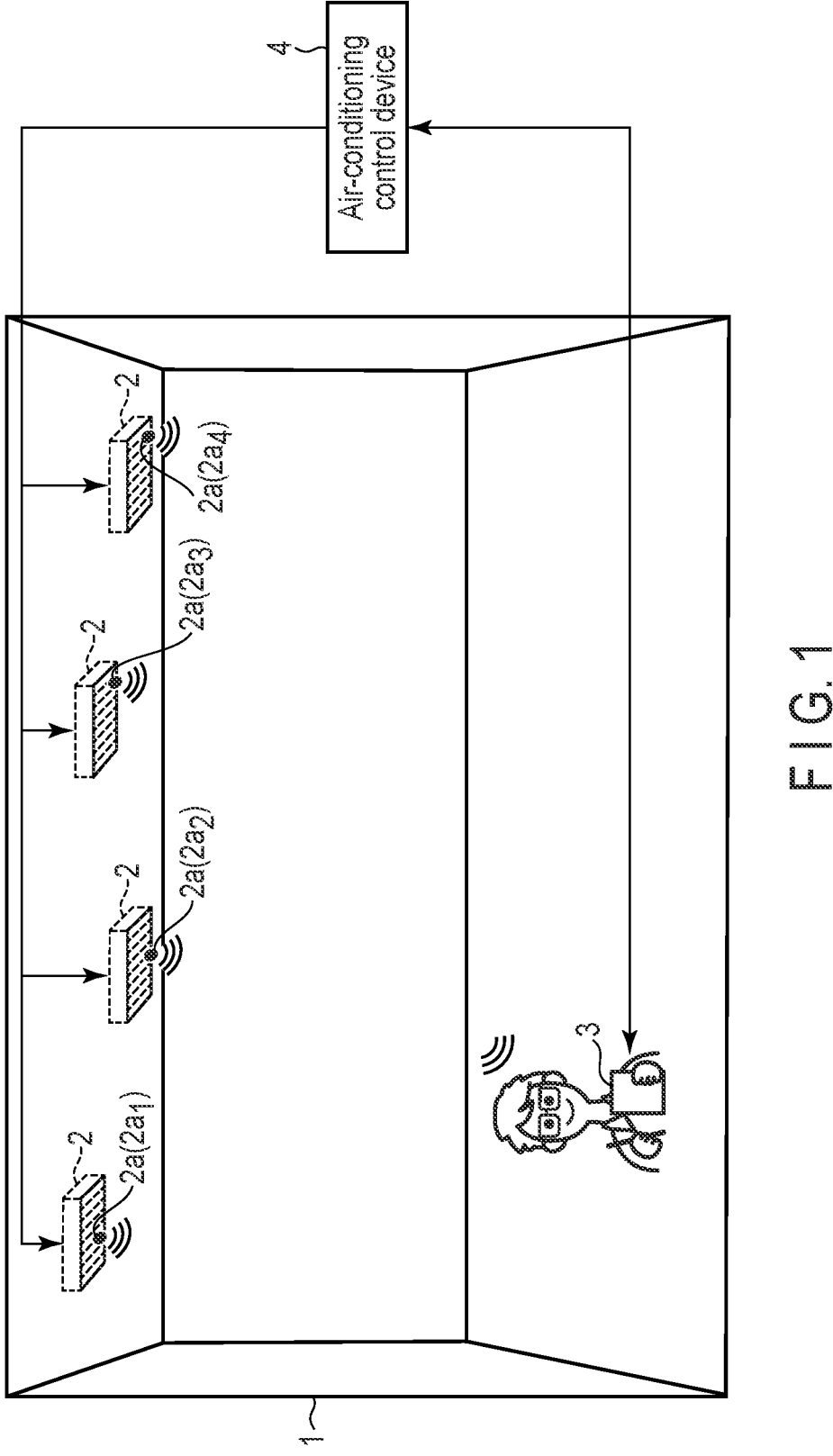
F I G. 1

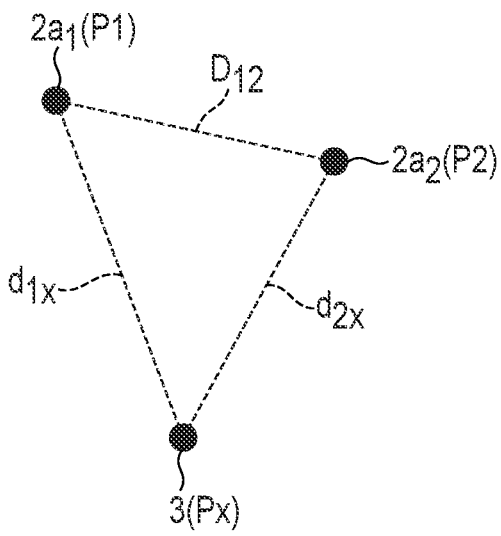
F I G. 2

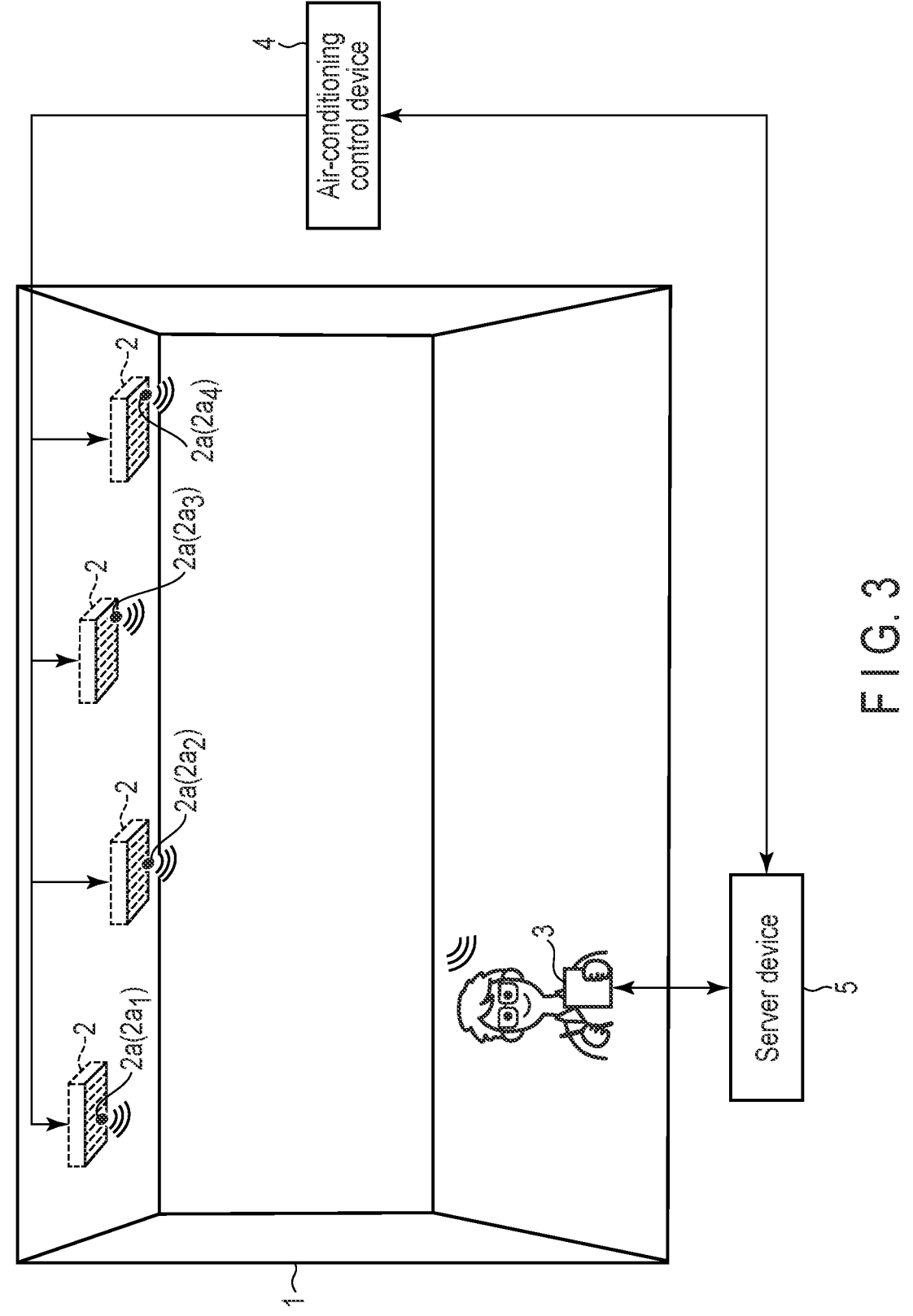
F I G. 3

2a

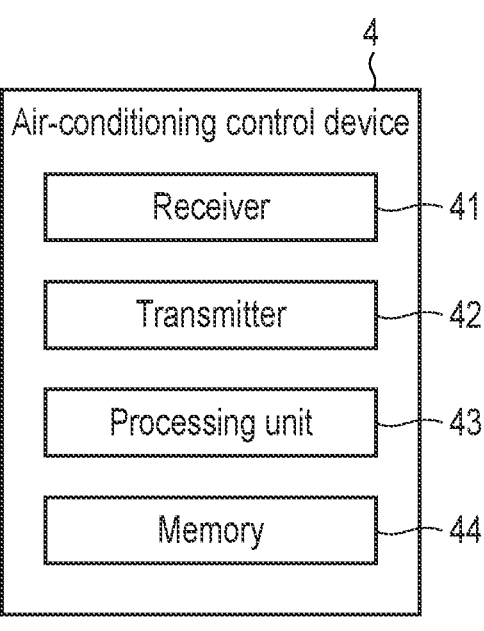
F I G. 6

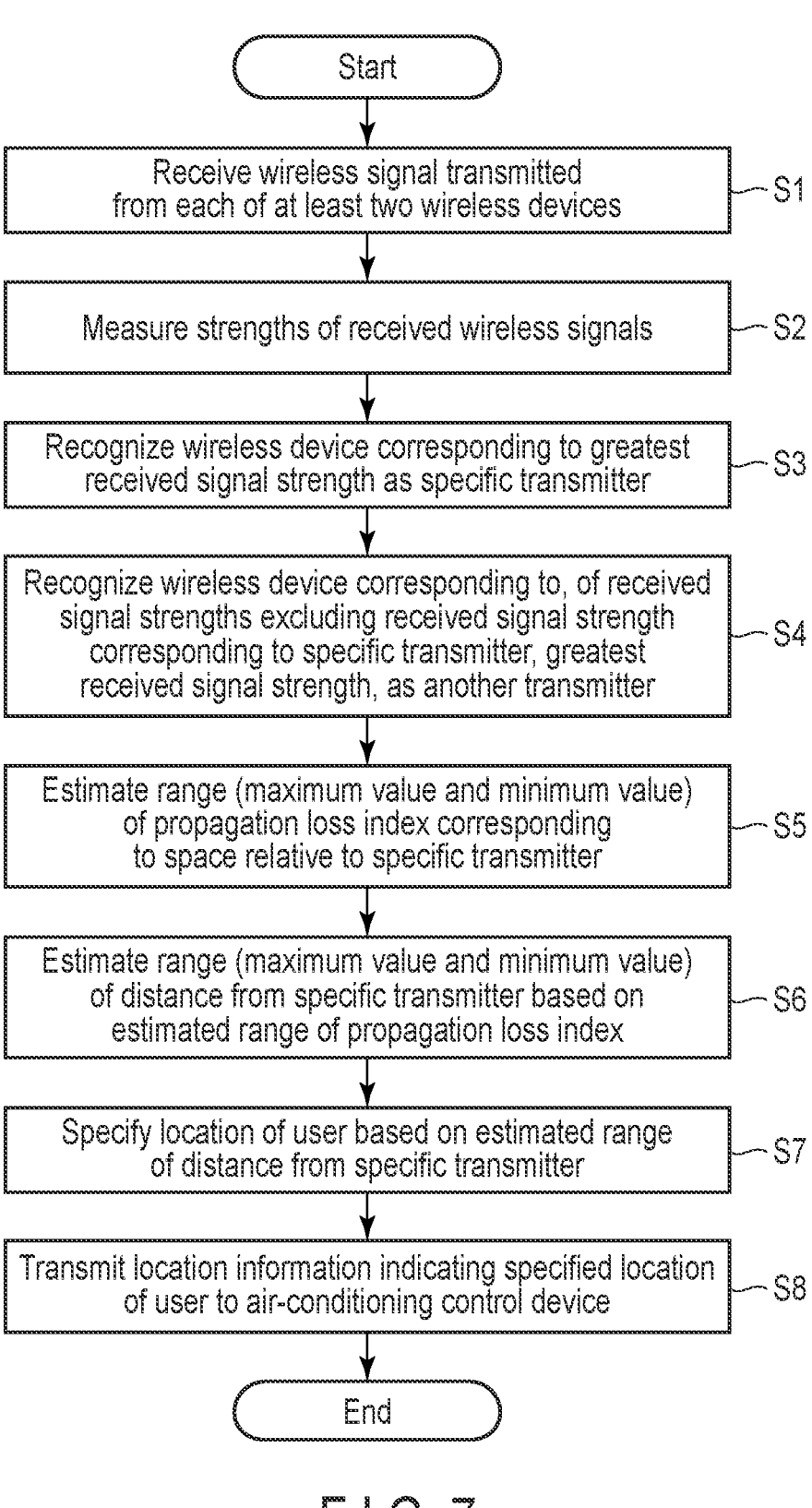
F I G. 7

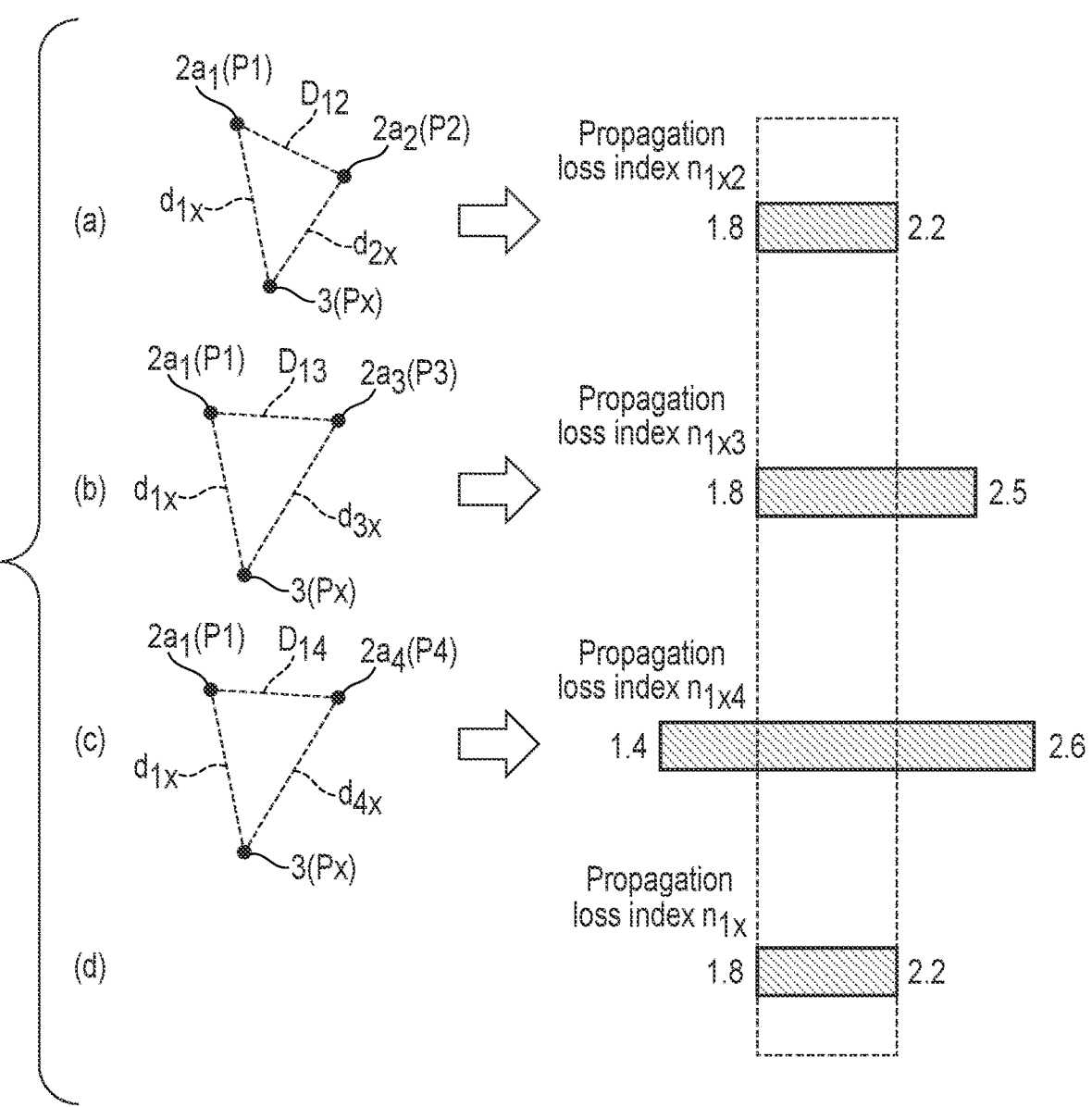
F I G. 8

METHOD, INFORMATION PROCESSING DEVICE AND SYSTEM

CROSS-REFERENCE TO RELATED APPLICATIONS

This application is based upon and claims the benefit of priority from Japanese Patent Application No. 2023-074536, filed Apr. 28, 2023, the entire contents of which are incorporated herein by reference.

FIELD

Embodiments described herein relate generally to a method, an information processing device and a system.

BACKGROUND

Recently, the control of electronic devices such as air conditioners and illumination devices has been sophisticated. For example, in a room (indoors) where a large number of electronic devices are installed, the operation of the electronic devices can be controlled for each zone. This configuration also enables the control of only the operation of an electronic device provided near a person who is present in a room where a large number of electronic devices are installed.

To control only the operation of an electronic device provided near a person who is present in a room, the location (zone) of the person needs to be specified. One of techniques of location measurement indoors focuses attention on the received power (the received signal strength) which is measured by transmitting and receiving a wireless signal between two devices (a transmitter and a receiver) comprising a wireless communication function. By this technique, the received signal strength can be converted into the distance between the transmitter and the receiver. The location of the receiver can be specified by three-point positioning, etc., based on the distance obtained by the conversion.

To specify a person who is present in a room as described above, this technique could be also used. However, a strong fading is generated by strong multipath indoors. Therefore, variation is generated in the received signal strength. Even if the received signal strength is converted into the distance between the transmitter and the receiver, a large difference from the actual distance is generated. To solve this problem, the attainment of a technique which can reduce this difference is desired.

BRIEF DESCRIPTION OF THE DRAWINGS

FIG. 1 is a diagram showing a general configuration example of an air-conditioning control system according to an embodiment.

FIG. 2 is a diagram for explaining a method for calculating a propagation loss index according to the embodiment.

FIG. 3 is a diagram showing a general configuration example of the air-conditioning control system according to the embodiment.

FIG. 6 is a diagram showing a general configuration example of an air-conditioning control device according to the embodiment.

FIG. 7 is a flowchart showing an example of the procedure of a location specifying process according to the embodiment.

FIG. 8 is a diagram for explaining a method for calculating a propagation loss index according to the embodiment.

DETAILED DESCRIPTION

Figure 4:
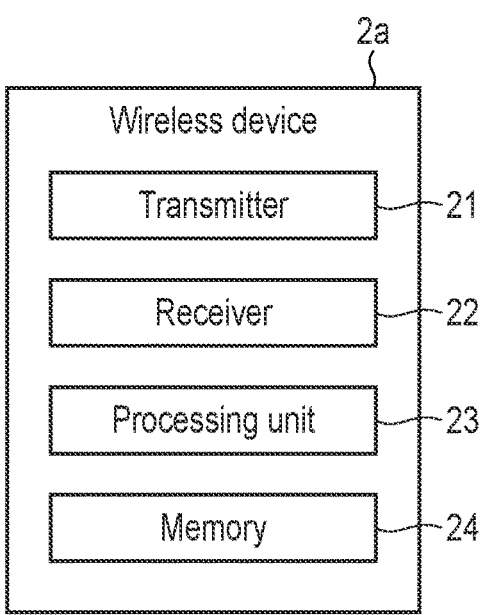
FIG. 4 is a diagram showing a general configuration example of a wireless device according to the embodiment.

In general, according to one embodiment, a method for obtaining a distance between a first wireless device installed in a known location and an information processing device which can wirelessly communicate with the first wireless device comprises receiving a first wireless signal transmitted from the first wireless device, receiving a second wireless signal transmitted from at least one second wireless device installed in a known location different from the first wireless device, and estimating a range of a propagation loss index corresponding to a space between the first wireless device and the information processing device based on a strength of the first wireless signal at the time of reception, a strength of the second wireless signal at the time of reception, and a distance between the first wireless device and the second wireless device. The propagation loss index is used to convert the strength of the first wireless signal at the time of reception into the distance between the first wireless device and the information processing device.

Embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numbers and their detailed descriptions may be omitted unless necessary.

FIG. 1 is a diagram showing a general configuration example of an air-conditioning control system according to an embodiment. FIG. 1 shows a case where four air conditioners 2 are installed in a room 1. It should be noted that the number of air conditioners 2 installed in the room 1 may be an arbitrary number as long as it is greater than or equal to two.

The air-conditioning control system of the embodiment is a system which controls the operation of the air conditioners 2 installed in known locations of the room 1 based on the location of the user who is present in the room 1.

A wireless device $2a$ (wireless devices $2a_1$, $2a_2$, $2a_3$ and $2a_4$) is mounted in each of the air conditioners 2 shown in FIG. 1. Each wireless device $2a$ performs wireless communication with another device comprising a wireless communication function. Specifically, each wireless device $2a$ performs wireless communication with another wireless device $2a$, an information processing device 3 carried by a user and an air-conditioning control device 4.

Each wireless device $2a$ should at least perform wireless communication. In the embodiment, it is assumed that each wireless device $2a$ is a Bluetooth (registered trademark) Low Energy (BLE) wireless device which performs shortrange wireless communication based on Bluetooth. As BLE is inexpensive, it is introduced into various systems. BLE is a wireless communication standard which can be relatively easily used. BLE defines 40 channels from 2.4 to 2.48 GHz. Three of these channels are advertising channels and used to transmit beacons, etc. The advertising channels are channels which can be used by a broadcast without establishing a connection. The advertising channels consist of two channels at the both ends of the band and one channel in the middle.

The information processing device 3 is a device which performs wireless communication with each wireless device 2a and the air-conditioning control device 4, and is, for example, a smartphone, a tablet or a wearable terminal.

The air-conditioning control device 4 transmits a control signal to the wireless device 2a mounted in each of the air conditioners 2 to control the operation of the air conditioner 2. The control of the operation of the air conditioner 2 includes, for example, the control of on/off of the air conditioner 2, the control of the operation mode (for example, a cooling mode, a heating mode and a blower mode) of the air conditioner 2 and the control of the temperature of the air conditioner 2.

The air-conditioning device 4 can transmit a control signal to only the wireless device 2a mounted in a desired air conditioner 2 and control only the operation of the desired air conditioner 2 by specifying the wireless device ID allocated in advance for the wireless device 2a mounted in the air conditioner 2.

Here, for example, when only the operation of, of the air conditioners 2 installed in the known locations of the room 1, the air conditioner 2 provided near the user should be controlled, it is necessary to specify which one of the air conditioners 2 the air conditioner 2 provided near the user is. For this specification, first, the location of the user who is present in the room 1 needs to be specified.

By the way, the received power which is measured by transmitting and receiving a wireless signal between two devices (a transmitter and a receiver) comprising a wireless communication function correlates with the distance between the two devices. Thus, the location of the user could be specified by converting the received power measured by transmitting and receiving a wireless signal between the wireless device 2a (transmitter) mounted in each of the air conditioners 2 and the information processing device 3 (receiver) carried by the user who is present in the room 1 into the distance between the wireless device 2a and the information processing device 3. It should be noted that, in the embodiment, the received power corresponds to the strength of a wireless signal (received signal) transmitted from a wireless device 2a when the wireless signal is received by the information processing device 3.

However, as the room 1 (indoor space) in which the air conditioners 2 are installed has walls, a floor, a ceiling, and fixtures (for example, furniture, etc.), wireless signals are reflected on the walls, floor, ceiling, fixtures and furniture, and strong multipath is generated. In this case, a frequency selective fading is generated, and the received signal strength (received power) may largely vary. This problem does not occur if the communication band for transmitting and receiving the wireless signal described above is sufficiently wide to the extent that the variation can be prevented. However, in narrowband communication such as the BLE described above, the received signal strength varies greatly in many cases. In a case where the received signal strength varies greatly, even if the strength of the received signal is converted into the distance between the wireless device 2a and the information processing device 3, a large difference is generated between the distance obtained by the conversion and the actual distance.

To solve this problem, the relationship between the received signal strength and the distance between each wireless device 2a and the information processing device 3 could be modeled in consideration of even variation by fading. However, for this modeling, a large number of matters need to be set in advance including the preliminary measurement of an antenna gain, the preset of a propagation loss index, etc. Thus, the modeling requires time and effort. In addition, in view of the possibility that the environment of the room 1 is frequently changed such as the coming and going of people in the room 1, the reallocation of furniture in the room 1, etc., merits which can be obtained by the modeling described above are less.

In the embodiment, this specification explains a method which can reduce the above difference which could be generated when the received signal strength is converted into the distance between each wireless device 2a and the information processing device 3. This method is different from the above modeling (in other words, the method requires less time and effort than the above modeling).

First, this specification explains a known method for converting the received signal strength into the distance between a transmitter and a receiver.

In general, the received power in a free space is proportional to the transmitted power and the antenna gain, and is inversely proportional to the square of the distance between the transmitter and the receiver and the inverse square of the wavelength. Thus, the received power can be shown by formula (1).

$$P_r = P_t \frac{G_r G_t}{L} \left(\frac{\lambda}{4\pi}\right)^2 \left(\frac{1}{d}\right)^n \tag{1}$$

In formula (1), $P_r$ represents the received power, and $P_t$ represents the transmitted power.

In formula (1), $G_r$ represents the antenna gain at the receiver, and $G_t$ represents the antenna gain at the transmitter.

Further, in formula (1), L represents the system loss (propagation loss) including an insertion loss and an alignment loss (matching loss).

In formula (1), d represents the distance between the transmitter and the receiver.

Moreover, in formula (1), $\lambda$ represents the wavelength, and n represents the propagation loss index.

When formula (1) is shown by decibel notation, the formula can be transformed into formula (2).

$$P_{r\_dB} = P_{t\_dB} + G_{r\_dB} + G_{t\_dB} - L_{dB} + 20\log\left(\frac{\lambda}{4\pi}\right) - 10n\log(d) \tag{2}$$

In formula (2), $P_{r\_db}$ represents the received power in decibel notation, in other words, the strength of the received signal. In formula (2), $P_{t\_db}$ represents the transmitted power in decibel notation, in other words, the strength of the wireless signal (transmitted signal) at the time of transmission.

In formula (2), $G_{r\_db}$ represents the antenna gain at the receiver in decibel notation, and $G_{t\_db}$ represents the antenna gain at the transmitter in decibel notation.

Further, in formula (2), $L_{db}$ represents the system loss in decibel notation.

Here, when the antennas provided in both the transmitter and the receiver are assumed to be nondirectional antennas (omni-antennas), both antenna gain at the receiver $G_{r\_db}$ and antenna gain at the transmitter $G_{t\_db}$ in formula (2) are zero. When system loss $L_{db}$ in formula (2) is assumed to be zero, formula (2) can be transformed into formula (3).

$$P_{r\_dB} = P_{t\_dB} + 20\log\left(\frac{\lambda}{4\pi}\right) - 10n\log(d) \qquad (3)$$

When formula (3) is transformed, distance d can be shown by formula (4).

$$d = 10^{\frac{P_{t\_dB} + 20\log\left(\frac{\lambda}{4\pi}\right) - P_{r\_dB}}{10n}} \qquad (4)$$

By formula (4), distance d between the transmitter and the receiver can be calculated based on strength $P_{r\_db}$ of the received signal, strength $P_{t\_db}$ of the transmitted signal and propagation loss index n. Strength $P_{t\_db}$ of the transmitted signal is a known value which depends on the performance of the transmitter. Propagation loss index n is, for example, set in advance. In other words, if only strength $P_{r\_db}$ of the received signal is measured in the receiver, strength $P_{r\_db}$ of the received signal can be converted into distance d between the transmitter and the receiver.

However, as described above, a strong fading is generated by strong multipath indoors such as in a room. Therefore, variation is generated in strength $P_{r\_db}$ of the received signal. Even if strength $P_{r\_db}$ of the received signal is converted into distance d between the transmitter and the receiver by using the above formula (4), a large difference from the actual distance between the transmitter and the receiver is generated.

To solve this problem, in the embodiment, when strength $P_{r\_db}$ of the received signal is converted into distance d by using the above formula (4), propagation loss index n which is set in advance is not used. Instead, a propagation loss index corresponding to the space between the transmitter and the receiver is calculated (estimated), and this calculated propagation loss index is used to convert strength $P_{r\_db}$ of the received signal into distance d.

Hereinafter, this specification explains a method for calculating (estimating) a propagation loss index corresponding to the space between a transmitter and a receiver.

A propagation loss index corresponding to the space between a transmitter and a receiver is calculated by using information related to the transmitter (hereinafter, referred to as a specific transmitter), the receiver, and another transmitter which is different from the specific transmitter and which can wirelessly communicate with the receiver. More specifically, a propagation loss index corresponding to the space between a specific transmitter and a receiver is calculated based on the received signal strength measured by transmitting and receiving a wireless signal between the specific transmitter and the receiver, the received signal strength measured by transmitting and receiving a wireless signal between another transmitter and the receiver, and the distance between the specific transmitter and the different transmitter. Now, this specification specifically explains a method for calculating a propagation loss index corresponding to the space between a specific transmitter and a receiver with reference to FIG. 2.

FIG. 2 is a diagram for explaining a method for calculating a propagation loss index corresponding to the space between the wireless device $2a_1$ and the information processing device 3 included in the air-conditioning control system according to the embodiment. In this case, the wireless device $2a_1$ corresponds to the specific transmitter, and the information processing device 3 corresponds to the receiver, and the wireless device $2a_2$ corresponds to the different transmitter.

In FIG. 2, P1 indicates the location of the wireless device $2a_1$, and P2 indicates the location of the wireless device $2a_2$, and Px indicates the location of the information processing device 3. Further, in FIG. 2, dix indicates the distance between the wireless device $2a_1$ and the information processing device 3 (in other words, the distance between location P1 and location Px). In FIG. 2, $d_{2x}$ indicates the distance between the wireless device $2a_2$ and the information processing device 3 (in other words, the distance between location P2 and location Px). Moreover, in FIG. 2, $D_{12}$ indicates the distance between the wireless device $2a_1$ and the wireless device $2a_2$ (in other words, the distance between location P1 and location P2).

First, distance dix between the wireless device $2a_1$ and the information processing device 3 can be shown by formula (5) based on the above formula (4).

$$d_{1x} = 10^{\frac{P_{t\_dB} + 20\log\left(\frac{\lambda}{4\pi}\right) - P_{1x\_dB}}{10n_{1x2}}} \qquad (5)$$

Similarly, distance $d_{2x}$ between the wireless device $2a_2$ and the information processing device 3 can be shown by formula (6) based on the above formula (4).

$$d_{2x} = 10^{\frac{P_{t\_dB} + 20\log\left(\frac{\lambda}{4\pi}\right) - P_{2x\_dB}}{10n_{1x2}}} \qquad (6)$$

In formula (5), $P_{1x\_db}$ represents the strength of a wireless signal (received signal) transmitted from the wireless device $2a_1$ when the wireless is received by the information processing device 3. In formula (6), $P_{2x\_db}$ represents the strength of a wireless signal (received signal) transmitted from the wireless device $2a_2$ when the wireless signal is received by the information processing device 3. Further, in formula (5) and formula (6), n1x2 represents a propagation loss index corresponding to the space between the wireless device $2a_1$ and the information processing device 3 and calculated by using the wireless device $2a_2$ as another transmitter.

Hereinafter, the term which is common to both formula (5) and formula (6) is shown by formula (7).

$$C = P_{t\_dB} + 20\log\left(\frac{\lambda}{4\pi}\right) \qquad (7)$$

Here, the length (distance) of each side of the triangle formed by connecting location P1 of the wireless device $2a_1$ (the location of the specific transmitter), location Px of the information processing device 3 (the location of the receiver) and location P2 of the wireless device $2a_2$ (the location of the different transmitter) has the relationship shown in formula (8) because of the nature of the sides of triangles.

$$d_{1x} + d_{2x} > D_{12} \tag{8}$$

When formula (5) to formula (7) are substituted into formula (8), formula (8) can be transformed into formula (9).

$$10^{\frac{C-P_{1x\_dB}}{10n_{1x2}}} + 10^{\frac{C-P_{2x\_dB}}{10n_{1x2}}} > D_{12} \tag{9}$$

The length (distance) of each side of the triangle formed by connecting location P1 of the wireless device $2a_1$ (the location of the specific transmitter), location Px of the information processing device 3 (the location of the receiver) and location P2 of the wireless device $2a_2$ (the location of the different transmitter) has the relationship shown in formula (10) as a relationship different from the relationship shown in formula (8) because of the nature of the sides of triangles.

$$|d_{1x} - d_{2x}| < D_{12} \tag{10}$$

When formula (5) to formula (7) are substituted into formula (10), formula (10) can be transformed into formula (11).

$$\left| 10^{\frac{C-P_{1x\_dB}}{10n_{1x2}}} - 10^{\frac{C-P_{2x\_dB}}{10n_{1x2}}} \right| < D_{12} \tag{11}$$

Strengths $P_{1x\_db}$ and $P_{2x\_db}$ of received signals are measured by the information processing device 3 corresponding to the receiver. Further, as described above, as each air conditioner 2 of the embodiment is installed in a known location, distance $D_{12}$ is calculated by, for example, the information processing device 3 by using the coordinates indicating the location of each air conditioner 2. Moreover, the embodiment assumes a case where strength $P_{t\_db}$ of the transmitted signal of the wireless device $2a$ mounted in each air conditioner 2 is the same value (in other words, is fixed) regardless of the wireless device.

By this configuration, the maximum value and minimum value of propagation loss index $n_{1x2}$ can be calculated (estimated) by using the above formula (9) and formula (11). Thus, the range of propagation loss index $n_{1x2}$ defined by the maximum value and minimum value of propagation loss index $n_{1x2}$ can be calculated (estimated). Further, for example, the median value of the calculated range of propagation loss index $n_{1x2}$ can be uniquely calculated as propagation loss index $n_{1x}$ corresponding to the space between the wireless device $2a_1$ corresponding to the specific transmitter and the information processing device 3 corresponding to the receiver.

According to the method explained above, the range of propagation loss index $n_{1x2}$ corresponding to the space between the wireless device $2a_1$ and the information processing device 3 (and propagation loss index $n_{1x}$) can be calculated. The range of propagation loss index $n_{1x2}$ (and propagation loss index $n_{1x}$) is used when strength $P_{1x\_db}$ of the received signal is converted into the range of distance dix (and distance $d_{1x}$). By this configuration, it is possible to reduce the difference which could be generated relative to the actual distance compared with a case where strength $P_{1x\_db}$ of the received signal is converted into distance dix by using propagation loss index n set in advance.

Here, for example, this specification explains a case where the information processing device 3 calculates the range of propagation loss index $n_{1x2}$ corresponding to the space between the wireless device $2a_1$ and the information processing device 3. However, for example, the air-conditioning control device 4 may obtain information indicating strengths $P_{1x\_db}$ and $P_{2x\_db}$ of received signals from the information processing device 3 and calculate the range of propagation loss index $n_{1x2}$. Alternatively, as shown in FIG. 3, a server device 5 which can wirelessly communicate with the information processing device 3 and the air-conditioning control device 4 may be further provided, and the server device 5 may obtain information indicating strengths $P_{1x\_db}$ and $P_{2x\_db}$ of received signals from the information processing device 3 and calculate the range of propagation loss index $n_{1x2}$.

FIG. 4 is a diagram showing a general configuration example of each wireless device $2a$. As shown in FIG. 4, each wireless device $2a$ comprises a transmitter 21, a receiver 22, a processing unit 23 and a memory 24.

The transmitter 21 transmits wireless signals to other devices (for example, another wireless device $2a$, the information processing device 3 and the air-conditioning control device 4) comprising a wireless communication function. For example, the transmitter 21 transmits a wireless signal (beacon) including the wireless ID allocated for the self-device to the information processing device 3.

The receiver 22 receives wireless signals from other devices (for example, another wireless device $2a$, the information processing device 3 and the air-conditioning control device 4) comprising a wireless communication function. For example, the receiver 22 receives a wireless signal (control signal) transmitted from the air-conditioning control device 4 and including a command for controlling the operation of the air conditioner 2.

The processing unit 23 is a CPU and is a processor which controls the operation of various components provided in the wireless device $2a$. The memory 24 functions as a buffer which temporarily stores a command, etc., received by the receiver 22.

Figure 5:
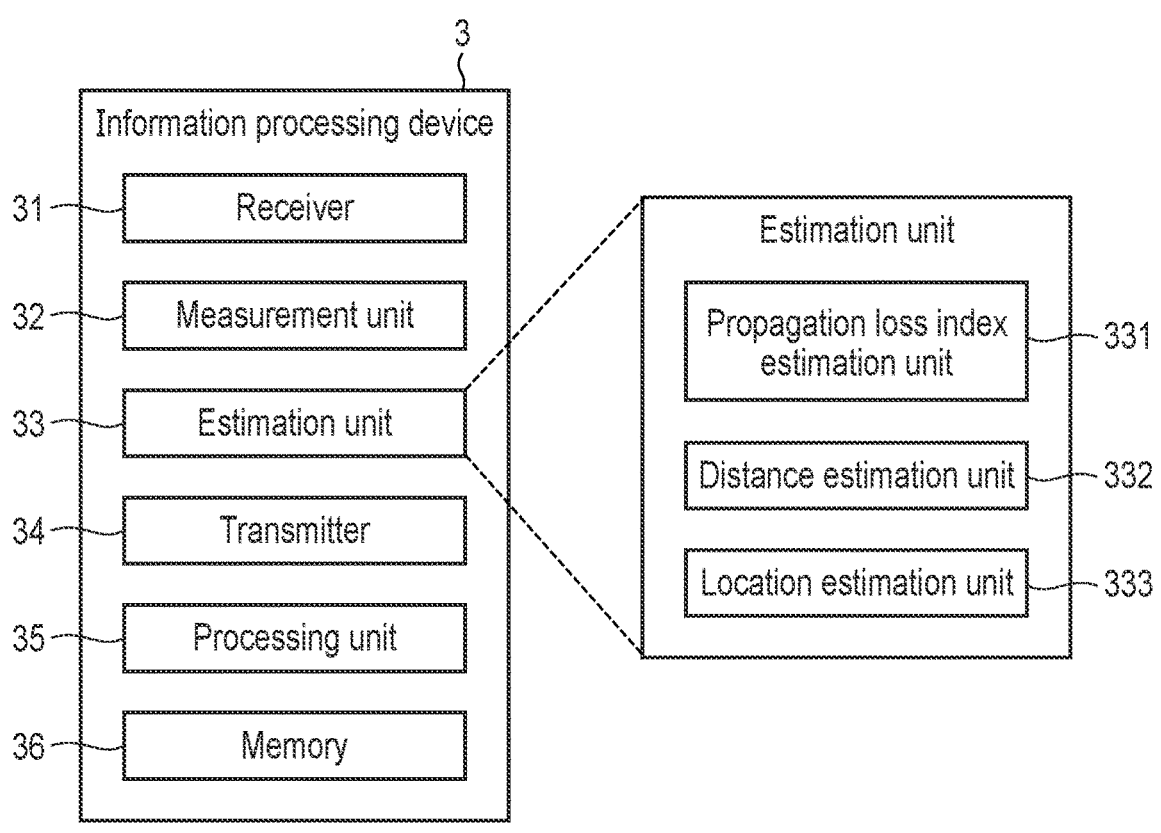
FIG. 5 is a diagram showing a general configuration example of an information processing device according to the embodiment.

FIG. 5 is a diagram showing a general configuration example of the information processing device 3. As shown in FIG. 5, the information processing device 3 comprises a receiver 31, a measurement unit 32, an estimation unit 33, a transmitter 34, a processing unit 35 and a memory 36.

The receiver 31 receives wireless signals from other devices (for example, each wireless device $2a$ and the air-conditioning control device 4) comprising a wireless communication function. For example, the receiver 31 receives a wireless signal transmitted from the wireless device $2a$ mounted in each air conditioner 2 and including a wireless device ID.

The measurement unit 32 measures the strength of a wireless signal (received signal) received by the receiver 31.

The estimation unit 33 includes a propagation loss index estimation unit 331, a distance estimation unit (conversion unit) 332 and a location estimation unit (specification unit) 333 as shown in FIG. 5.

The propagation index estimation unit 331 performs a series of processes based on the above formula (5) to formula (11) and estimates (calculates) the range of a propagation loss index corresponding to the space between a wireless device 2a corresponding to the specific transmitter and the information processing device 3. Further, the propagation loss index estimation unit 331 calculates the median value of the estimated range of the propagation loss index as the propagation loss index corresponding to the space between the wireless device 2a corresponding to the specific transmitter and the information processing device 3.

When the receiver 31 receives wireless signals transmitted from a plurality of wireless devices 2a, and the measurement unit 32 measures the strength of each wireless signal (received signal), the propagation loss index estimation unit 331 recognizes the wireless device 2a which transmits a wireless signal corresponding to, of the measured strengths of the received signals, the greatest received signal strength, as the specific transmitter, and recognizes a wireless device 2a which transmits a wireless signal corresponding to another received signal strength as another transmitter. Alternatively, the propagation loss index estimation unit 331 may recognize, of a plurality of wireless devices 2a, a single wireless device 2a which is determined in advance, as the specific transmitter, and recognize another wireless device 2a as another transmitter.

When, of the strengths of the received signals measured by the measurement unit 32, the strengths of at least two received signals are greater than or equal to a threshold (for example, 70 dBm) set in advance, the propagation loss index estimation unit 331 starts the estimation of the range of the propagation loss index described above. When the number of strengths of received signals greater than or equal to the threshold is less than two, the propagation loss index estimation unit 331 terminates the estimation of the range of the propagation loss index described above.

The distance estimation unit 332 applies the range of the propagation loss index estimated (calculated) by the propagation loss index estimation unit 331 and corresponding to the space between the wireless device 2a corresponding to the specific transmitter and the information processing device 3 to the above formula (4), and converts the strength of the wireless signal (the strength of the received signal) from the wireless device 2a into the range of the distance between the wireless device 2a and the information processing device 3. More specifically, the distance estimation unit 332 applies the range of the propagation loss index estimated by the propagation loss index estimation unit 331, the strength of the wireless signal (the strength of the received signal) from the wireless device 2a corresponding to the specific transmitter measured by the measurement unit 32, the strength of the wireless signal (the strength of the transmitted signal) transmitted from the wireless device 2a and the wavelength calculated based on the frequency of the wireless signal to the above formula (4), and converts the strength of the received signal into the range of the distance between the wireless device 2a and the information processing device 3.

Alternatively, the distance estimation unit 332 applies the propagation loss index calculated by the propagation loss index estimation unit 331 and corresponding to the space between the wireless device 2a corresponding to the specific transmitter and the information processing device 3 to the above formula (4), and converts the strength of the wireless signal (the strength of the received signal) from the wireless device 2a into the distance between the wireless device 2a and the information processing device 3. More specifically, the distance estimation unit 332 applies the propagation loss index calculated by the propagation loss index estimation unit 331, the strength of the wireless signal (the strength of the received signal) from the wireless device 2a corresponding to the specific transmitter measured by the measurement unit 32, the strength of the wireless signal (the strength of the transmitted signal) transmitted from the wireless device 2a and the wavelength calculated based on the frequency of the wireless signal to the above formula (4), and converts the strength of the received signal into the distance between the wireless device 2a and the information processing device 3.

The location estimation unit 333 performs three-point positioning based on at least three distances between the wireless device 2a and the information processing device 3 calculated by the propagation loss index estimation unit 331 and the distance estimation unit 332 (for example, in FIG. 1, the distance between the wireless device $2a_1$ and the information processing device 3, the distance between the wireless device $2a_2$ and the information processing device 3 and the distance between the wireless device $2a_3$ and the information processing device 3), and specifies (estimates) the location of the information processing device 3 (in other words, the location of the user) in the room 1.

The transmitter 34 transmits wireless signals to other devices (for example, each wireless device 2a and the air-conditioning control device 4) comprising a wireless communication function. For example, the transmitter 34 transmits location information indicating the location of the user specified by the location estimation unit 333 to the air-conditioning control device 4.

The processing unit 35 is a CPU and is a processor which controls the operation of various components provided in the information processing device 3. The memory 36 stores various programs which are executed by the processing unit 35.

FIG. 6 is a diagram showing a general configuration example of the air-conditioning control device 4. As shown in FIG. 6, the air-conditioning control device 4 comprises a receiver 41, a transmitter 42, a processing unit 43 and a memory 44.

The receiver 41 receives wireless signals from other devices (for example, each wireless device 2a and the information processing device 3) comprising a wireless communication function. For example, the receiver 41 receives location information transmitted from the information processing device 3 and indicating the location of the user.

The transmitter 42 transmits wireless signals to other devices (for example, each wireless device 2a and the information processing device 3) comprising a wireless communication function. For example, the transmitter 42 transmits a control signal including a command for controlling the operation of an air conditioner 2 provided near the location of the user indicated by the location information received by the receiver 41, while specifying the wireless device ID of the wireless device 2a mounted in the air conditioner 2.

The processing unit 43 is a CPU and is a processor which controls the operation of various components provided in the air-conditioning control device 4. It should be noted that the processing unit 43 may comprise a function similar to that of the estimation unit 33 shown in FIG. 5. By this configuration, as well as the information processing device 3, the air-conditioning control device 4 can estimate the range of a propagation loss index corresponding to the space between a wireless device 2a corresponding to the specific transmitter and the information processing device 3, convert the strength of a wireless signal (the strength of a received signal) from the wireless device 2a into the range of the distance between the wireless device 2*a* and the information processing device 3, specify the location of the information processing device 3, etc. The memory 44 stores various programs which are executed by the processing unit 43.

Here, this specification explains an example of the procedure of a location specifying process for specifying the location of the user who carries the information processing device 3 with reference to the flowchart of FIG. 7.

First, the receiver 31 of the information processing device 3 receives a wireless signal transmitted from the wireless device 2*a* mounted in each of at least two air conditioners 2 (step S1).

Subsequently, the measurement unit 32 of the information processing device 3 measures each of the strengths of the wireless signals (the strengths of the received signals) received in the process of step S1 (step S2).

The propagation loss index estimation unit 331 of the information processing device 3 recognizes a wireless device 2*a* corresponding to, of the received signal strengths measured in the process of step S2, the greatest received signal strength, as the specific transmitter (step S3).

Further, the propagation loss index estimation unit 331 recognizes a wireless device 2*a* corresponding to, of the received signal strengths excluding the received signal strength corresponding to the specific transmitter from the received signal strengths measured in the process of step S2, the greatest received signal strength, as another transmitter (step S4). As described in detail later, instead of recognizing only the wireless device 2*a* corresponding to, of the received signal strengths excluding the received signal strength corresponding to the specific transmitter, the greatest received signal strength, as another transmitter, the propagation loss index estimation unit 331 may recognize all of the wireless devices 2*a* other than the wireless device 2*a* recognized as the specific transmitter as other transmitters.

Subsequently, the propagation loss index estimation unit 331 estimates the range (the maximum value and minimum value) of a propagation loss index corresponding to the space relative to the specific transmitter recognized in the process of step S3 based on the above formula (5) to formula (11) (step S5).

More specifically, the propagation loss index estimation unit 331 estimates the range of a propagation loss index corresponding to the space relative to the specific transmitter based on the strength of a wireless signal (the strength of a received signal) transmitted from the wireless device 2*a* recognized as the specific transmitter in the process of step S3 when the wireless signal is received, the strength of a wireless signal (the strength of a received signal) transmitted from the wireless device 2*a* recognized as the different transmitter in the process of step S4 when the wireless signal is received, and the distance between the wireless device 2*a* recognized as the specific transmitter and the wireless device 2*a* recognized as the different transmitter.

It should be noted that, in the process of step S5, the propagation loss index estimation unit 331 may further calculate the median value of the estimated range of the propagation loss index as a propagation loss index corresponding to the space relative to the specific transmitter recognized in the process of step S3.

Subsequently, the distance estimation unit 332 of the information processing device 3 estimates the range (the maximum value and minimum value) of the distance from the specific transmitter recognized in the process of step S3 based on the range of the propagation loss index estimated in the process of step S5 (step S6).

It should be noted that, in the process of step S6, the distance estimation unit 332 may further calculate the distance from the specific transmitter recognized in the process of step S3 based on the propagation loss index calculated in the process of step S5.

The information processing device 3 repeats the processes of step S3 to step S6 described above at least three times. However, it is assumed that, in the process of the second step S3, instead of the wireless device 2*a* corresponding to the greatest received signal strength, a wireless device 2*a* corresponding to the second greatest received signal strength is recognized as the specific transmitter. Further, it is assumed that, in the process of the second step S4, a wireless device 2*a* corresponding to the first strength (a wireless device 2*a* corresponding to the greatest received signal strength) is recognized as another transmitter. Further, it is assumed that, in the process of the third step S3, instead of the wireless device 2*a* corresponding to the greatest received signal strength, a wireless device 2*a* corresponding to the third greatest received signal strength is recognized as the specific transmitter. Further, it is assumed that, in the process of the third step S4, a wireless device 2*a* corresponding to the first strength (a wireless device 2*a* corresponding to the greatest received signal strength) is recognized as another transmitter. This configuration enables the estimation of at least the range of the distance between a wireless device 2*a* corresponding to the greatest received signal strength and the information processing device 3, the range of the distance between a wireless device 2*a* corresponding to the second greatest received signal strength and the information processing device 3 and the range of the distance between a wireless device 2*a* corresponding to the third greatest received signal strength and the information processing device 3.

The location estimation unit 333 of the information processing device 3 performs three-point positioning based on at least three ranges of the distances between the wireless devices 2*a* and the information processing device 3 and specifies (estimates) the location of the information processing device 3 (in other words, the location of the user (step S7).

Subsequently, the transmitter 34 of the information processing device 3 transmits the location information estimated in the process of step S7 and indicating the location of the user to the air-conditioning control device 4 (step S8) and terminates a series of processes which should be performed here.

When the air-conditioning control device 4 receives the location information transmitted from the information processing device 3, the air-conditioning control device 4 transmits a control signal including a command for controlling the operation of an air conditioner 2 provided near the location of the user indicated by the location information, while specifying the wireless device ID of the wireless device 2*a* mounted in the air conditioner 2. This configuration enables the control of only the operation of the air conditioner 2 provided near the user.

In the embodiment explained above, a propagation loss index corresponding to the space between a specific transmitter and a receiver is calculated based on information related to the specific transmitter, the receiver and another transmitter. However, the propagation loss index may be calculated based on information related to the specific transmitter, the receiver and two or more other transmitters. Now, this specification explains a case where a propagation loss index corresponding to the space between a specific transmitter and a receiver is calculated by using information related to two or more other transmitters with reference to FIG. 8.

FIG. 8 is a diagram for explaining a method for calculating a propagation loss index corresponding to the space between the wireless device $2a_1$ and the information processing device 3 included in the air-conditioning control system according to the embodiment. In this case, the wireless device $2a_1$ corresponds to the specific transmitter, and the information processing device 3 corresponds to the receiver, and wireless devices $2a_2$, $2a_3$ and $2a_4$ correspond to the other transmitters.

In FIG. 8(b), P3 represents the location of the wireless device $2a_3$. In FIG. 8(c), P4 represents the location of the wireless device $2a_4$. In FIG. 8(b), $d_{3x}$ represents the distance between the wireless device $2a_3$ and the information processing device 3 (in other words, the distance between location P3 and location Px). In FIG. 8(c), $d_{4x}$ represents the distance between the wireless device $2a_4$ and the information processing device 3 (in other words, the distance between location P4 and location Px). Further, in FIG. 8(b), $D_{13}$ represents the distance between the wireless device $2a_1$ and the wireless device $2a_3$ (in other words, the distance between location P1 and location P3). In FIG. 8(c), $D_{14}$ represents the distance between the wireless device $2a_1$ and the wireless device $2a_4$ (in other words, the distance between location P1 and location P4).

FIG. 8(a) is the same case as FIG. 2 in which the wireless device $2a_1$ corresponds to the specific transmitter, and the information processing device 3 corresponds to the receiver, and the wireless device $2a_2$ corresponds to the different transmitter. In this case, the range (the maximum value and minimum value) of propagation loss index $n_{1x2}$ is calculated as a propagation loss index corresponding to the space between wireless device $2a_1$ and the information processing device 3 when a series of processes is performed based on the above formula (5) to formula (11). Here, it is assumed that, as shown in FIG. 8(a), the maximum value of propagation loss index $n_{1x2}$ is 2.2, and the minimum value is 1.8.

FIG. 8(b) is a case where the wireless device $2a_1$ corresponds to the specific transmitter, and the information processing device 3 corresponds to the receiver, and the wireless device $2a_3$ corresponds to the different transmitter. In this case, the range (the maximum value and minimum value) of propagation loss index $n_{1x3}$ is calculated as a propagation loss index corresponding to the space between the wireless device $2a_1$ and the information processing device 3 when a series of processes is performed based on the above formula (5) to formula (11). Propagation loss index $n_{1x3}$ is a propagation loss index corresponding to the space between the wireless device $2a_1$ and the information processing device 3 and calculated by using the wireless device $2a_3$ as the different transmitter. Here, it is assumed that, as shown in FIG. 8(b), the maximum value of propagation loss index $n_{1x3}$ is 2.5, and the minimum value is 1.8.

FIG. 8(c) is a case where the wireless device $2a_1$ corresponds to the specific transmitter, and the information processing device 3 corresponds to the receiver, and the wireless device $2a_4$ corresponds to the different transmitter. In this case, the range (the maximum value and minimum value) of propagation loss index $n_{1x4}$ is calculated as a propagation loss index corresponding to the space between the wireless device $2a_1$ and the information processing device 3 when a series of processes is performed based on the above formula (5) to formula (11). Propagation loss index $n_{1x4}$ is a propagation loss index corresponding to the space between the wireless device $2a_1$ and the information processing device 3 and calculated by using the wireless device $2a_4$ as the different transmitter. Here, it is assumed that, as shown in FIG. 8(c), the maximum value of propagation loss index $n_{1x4}$ is 2.6, and the minimum value is 1.4.

When, as shown in FIG. 8(a) to FIG. 8(c), the ranges of a plurality of propagation loss indices $n_{1x2}$, $n_{1x3}$ and $n_{1x4}$ are calculated as propagation loss indices corresponding to the space between the wireless device $2a_1$ and the information processing device 3, as shown in FIG. 8(d), the range in which the ranges of propagation loss indices $n_{1x2}$, $n_{1x3}$ and $n_{1x4}$ overlap each other may be calculated as the range of propagation loss index nix corresponding to the space between the wireless device $2a_1$ and the information processing device 3. In this case, as shown in FIG. 8(d), the maximum value of the range of propagation loss index $n_{1x}$ is 2.2, and the minimum value is 1.8.

Thus, when the range of a propagation loss index corresponding to the space between a specific transmitter and a receiver is calculated by using information related to two or more other transmitters, the range of the propagation loss index can have higher reliability compared with a case where the range of a propagation loss index corresponding to the space between a specific transmitter and a receiver is calculated by using information related to another transmitter.

In the embodiment explained above, it is assumed that each wireless device $2a$ is mounted in the corresponding air conditioner 2. However, each wireless device $2a$ may be extrinsically attached to the corresponding air conditioner 2. Further, some of the wireless devices $2a$ may be stand-alone wireless devices attached to a location different from that of the air conditioners 2. The stand-alone wireless devices $2a$ are different from the wireless devices $2a$ mounted in the air conditioners 2 or the wireless devices $2a$ extrinsically attached to the air conditioners 2 in respect that the stand-alone wireless devices $2a$ do not receive a control signal transmitted from the air-conditioning control device 4 and are only used to estimate a propagation loss index.

Moreover, in the embodiment explained above, each wireless device $2a$ is mounted in the corresponding air conditioner 2. However, each wireless device $2a$ may be mounted in another electronic device such as an illumination device. This configuration enables the realization of a device control system which controls the operation of a plurality of electronic devices installed in known locations in a room based on the location of the user who is present in the room. The embodiment explained above can provide a method, an information processing device and a system so as to reduce a difference which is generated when the received signal strength measured by transmitting and receiving a wireless signal between a transmitter and a receiver is converted into the distance between the transmitter and the receiver.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method executed by an information processing device to obtain a distance between the information processing device and a first wireless device which is installed in a known location and with which the first wireless device can wirelessly communicate, the method comprising:

receiving a first wireless signal transmitted from the first wireless device;

receiving a second wireless signal transmitted from at least one second wireless device installed in a known location different from the first wireless device; and estimating a range of a propagation loss index corresponding to a space between the first wireless device and the information processing device based on a strength of the first wireless signal at the time of reception, a strength of the second wireless signal at the time of reception, and a distance between the first wireless device and the second wireless device, wherein the propagation loss index is used to convert the strength of the first wireless signal at the time of reception into the distance between the first wireless device and the information processing device.

2. The method of claim 1, wherein the range of the propagation loss index is estimated based on the following formulas (1) and (2);

$$d_{1x} + d_{2x} > D_{12} \qquad (1)$$

$$|d_{1x} - d_{2x}| < D_{12} \qquad (2)$$

where d1x represents the distance between the first wireless device and the information processing device, d2x represents a distance between the second wireless device and the information processing device, and D12 represents the distance between the first wireless device and the second wireless device.

3. The method of claim 1, further comprising converting the strength of the first wireless signal at the time of reception into a range of the distance between the first wireless device and the information processing device by using the range of the propagation loss index.

4. The method of claim 3, further comprising:

calculating a median value of the range of the propagation loss index as the propagation loss index; and converting the strength of the first wireless signal at the time of reception into the distance between the first wireless device and the information processing device by using the propagation loss index.

5. The method of claim 3, further comprising specifying a location of the information processing device by using the range of the distance between the first wireless device and the information processing device.

6. The method of claim 1, wherein:

the range of the propagation loss index is estimated when the strength of the first wireless signal at the time of reception and the strength of the second wireless signal at the time of reception are greater than or equal to a threshold set in advance, and the range of the propagation loss index is not estimated when the strength of the first wireless signal at the time of reception and the strength of the second wireless signal at the time of reception are less than the threshold.

7. An information processing device which can wirelessly communicate with a first wireless device installed in a known location, the information processing device comprising:

a memory;

a receiver which receives a first wireless signal transmitted from the first wireless device, and a second wireless signal transmitted from at least one second wireless device installed in a known location different from the first wireless device;

a hardware processor which, under control of a program stored in the memory, is configured to execute processes comprising:

a measurement process which measures a strength of the first wireless signal at the time of reception and a strength of the second wireless signal at the time of reception; and an estimation process which estimates a range of a propagation loss index corresponding to a space between the first wireless device and the information processing device based on the strength of the first wireless signal at the time of reception, the strength of the second wireless signal at the time of reception, and a distance between the first wireless device and the second wireless device, wherein the propagation loss index is used to convert the strength of the first wireless signal at the time of reception into a distance between the first wireless device and the information processing device.

8. The information processing device of claim 7, wherein the range of the propagation loss index is estimated based on the following formulas (3) and (4):

$$d_{1x} + d_{2x} > D_{12} \qquad (3)$$

$$|d_{1x} - d_{2x}| < D_{12} \qquad (4)$$

where d1x represents the distance between the first wireless device and the information processing device, d2x represents a distance between the second wireless device and the information processing device, and D12 represents the distance between the first wireless device and the second wireless device.

9. The information processing device of claim 7, wherein the processes further comprise a conversion process which converts the strength of the first wireless signal at the time of reception into a range of the distance between the first wireless device and the information processing device by using the range of the propagation loss index.

10. The information processing device of claim 9, wherein:

the estimation process calculates a median value of the range of the propagation loss index as the propagation loss index, and the conversion process converts the strength of the first wireless signal at the time of reception into the distance between the first wireless device and the information processing device by using the propagation loss index.

11. The information processing device of claim 9, wherein the processes further comprise a specification process which specifies a location of the information processing device by using the range of the distance between the first wireless device and the information processing device.

12. The information processing device of claim 7, wherein:

the estimation process starts estimation of the range of the propagation loss index when the strength of the first wireless signal at the time of reception and the strength of the second wireless signal at the time of reception are greater than or equal to a threshold set in advance, and the estimation process terminates the estimation of the range of the propagation loss index when the strength of the first wireless signal at the time of reception and the strength of the second wireless signal at the time of reception are less than the threshold.

13. A system comprising:
the information processing device of claim 11;
the first wireless device;
the at least one second wireless device; and
a control device which can wirelessly communicate with the information processing device,
wherein
the first wireless device and the second wireless device are mounted in or extrinsically attached to electronic devices or installed in locations different from the electronic devices, and
the control device transmits a control signal for controlling operation of an electronic device provided near the information processing device based on the specified location of the information processing device.

\* \* \* \* \*